(12) United States Patent
El-Toufaili et al.

(10) Patent No.: US 9,315,626 B2
(45) Date of Patent: Apr. 19, 2016

(54) PROCESS FOR PREPARING POLYAMIDES

(75) Inventors: Faissal-Ali El-Toufaili, Ludwigshafen (DE); Philippe Desbois, Edingen-Neckarhausen (DE); Andreas Wollny, Ludwigshafen (DE); Sven Lawrenz, Ilvesheim (DE); Christian Schmidt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 167 days.

(21) Appl. No.: 13/514,364

(22) PCT Filed: Dec. 3, 2010

(86) PCT No.: PCT/EP2010/068788
§ 371 (c)(1),
(2), (4) Date: Jun. 7, 2012

(87) PCT Pub. No.: WO2011/069892
PCT Pub. Date: Jun. 16, 2011

(65) Prior Publication Data
US 2012/0245308 A1    Sep. 27, 2012

(30) Foreign Application Priority Data
Dec. 8, 2009   (EP) .................... 09178358

(51) Int. Cl.
*C08G 69/24* (2006.01)
*C08G 69/26* (2006.01)
*C08G 69/28* (2006.01)

(52) U.S. Cl.
CPC ............. *C08G 69/265* (2013.01); *C08G 69/28* (2013.01)

(58) Field of Classification Search
CPC ............................ C08G 69/28; C08G 69/265
See application file for complete search history.

(56) References Cited

U.S. PATENT DOCUMENTS

| | | | |
|---|---|---|---|
| 4,537,949 A | 8/1985 | Schmidt et al. | |
| 6,187,877 B1 | 2/2001 | Gotz et al. | |
| 2010/0190934 A1* | 7/2010 | Desbois et al. | 526/64 |
| 2010/0311918 A1 | 12/2010 | Toufaili | |
| 2011/0009566 A1 | 1/2011 | Jain et al. | |
| 2011/0021686 A1 | 1/2011 | Jain et al. | |
| 2011/0021687 A1 | 1/2011 | Jain et al. | |
| 2011/0092645 A1 | 4/2011 | Loth et al. | |
| 2011/0144300 A1 | 6/2011 | Desbois et al. | |
| 2011/0244743 A1 | 10/2011 | Scherzer et al. | |
| 2011/0290209 A1 | 12/2011 | Desbois et al. | |
| 2011/0294910 A1 | 12/2011 | Kriha et al. | |
| 2011/0294968 A1 | 12/2011 | Abboud et al. | |
| 2011/0306718 A1 | 12/2011 | Scherzer et al. | |
| 2012/0004353 A1 | 1/2012 | Prusty et al. | |
| 2012/0022187 A1 | 1/2012 | Desbois et al. | |
| 2012/0029137 A1 | 2/2012 | Jain et al. | |
| 2012/0041086 A1 | 2/2012 | Sampath et al. | |
| 2012/0065339 A1 | 3/2012 | Grutzner et al. | |
| 2012/0083541 A1 | 4/2012 | Khvorost et al. | |
| 2012/0083579 A1 | 4/2012 | Weber et al. | |
| 2012/0088048 A1 | 4/2012 | Scherzer et al. | |
| 2012/0088899 A1 | 4/2012 | Scherzer et al. | |
| 2012/0119402 A1 | 5/2012 | Desbois et al. | |
| 2012/0141791 A1 | 6/2012 | Biedasek et al. | |
| 2012/0142794 A1 | 6/2012 | Desbois et al. | |
| 2012/0142887 A1 | 6/2012 | Desbois et al. | |
| 2012/0157594 A1 | 6/2012 | Schmidt et al. | |

FOREIGN PATENT DOCUMENTS

| | | |
|---|---|---|
| DE | 19514145 A1 | 10/1996 |
| EP | 129195 A2 | 12/1984 |

(Continued)

OTHER PUBLICATIONS

International Search Report for PCT/EP2010/068788 mailed Mar. 7, 2011.
International Preliminary Report on Patentability for PCT/EP2010/068788 mailed Oct. 24, 2011.
International Preliminary Report on Patentability from PCT/EP2010/068788 dated Aug. 1, 2012.

(Continued)

*Primary Examiner* — Gregory Listvoyb
(74) *Attorney, Agent, or Firm* — Drinker Biddle & Reath LLP

(57) ABSTRACT

The present invention relates to a process for preparing a polyamide based on dicarboxylic acids and diamines, comprising the following stages:
A) providing an aqueous monomer mixture composed of dicarboxylic acids and diamines, where the molar ratio of dicarboxylic acids to diamines is adjusted such that, at the outlet of stage C), there is a molar deficiency of dicarboxylic acids or diamines of 1 to 10 mol %, based on the respective other component,
B) transferring the aqueous mixture from stage A) into a continuous evaporator reactor in which diamines and dicarboxylic acids are converted at a temperature in the range from 100 to 370° C. and a pressure in the range from 1 to 50 bar,
C) transferring the mixture from stage B) into a separator which is operated at a temperature in the range from 100 to 370° C. and a pressure in the range from 1 to 50 bar with removal of gaseous components,
D) transferring the mixture from stage C) together with diamine or dicarboxylic acid in an amount suitable for compensation for the molar deficiency into a tubular reactor which is operated at a temperature in the range from 100 to 370° C. and a pressure in the range from 1 to 50 bar, for a residence time in the range from 10 seconds to 30 minutes,
E) transferring the mixture from stage D) into an extruder which is operated at a temperature in the range from 150 to 400° C. for a residence time in the range from 10 seconds to 30 minutes with removal of gaseous components through venting orifices.

12 Claims, No Drawings

(56) References Cited

FOREIGN PATENT DOCUMENTS

| | | | |
|---|---|---|---|
| JP | 2004091595 | * | 3/2004 |
| JP | 2004091595 A | | 3/2004 |
| WO | WO-2007085406 A1 | | 8/2007 |
| WO | WO-2008155281 A1 | | 12/2008 |
| WO | WO-2011/000816 A1 | | 1/2011 |
| WO | WO-2011/009798 A1 | | 1/2011 |
| WO | WO-2011/009877 A1 | | 1/2011 |
| WO | WO-2011/039301 A1 | | 4/2011 |
| WO | WO-2011/069942 A1 | | 6/2011 |

OTHER PUBLICATIONS

U.S. Appl. No. 61/371,180.
U.S. Appl. No. 13/110,207.
U.S. Appl. No. 13/504,299.
U.S. Appl. No. 13/514,445.
U.S. Appl. No. 61/370,473.
U.S. Appl. No. 61/316,848.
U.S. Appl. No. 13/097,683, filed Apr. 29, 2011, Jain et al.
Translation of JP2004091595 (originally submitted on May 30, 2012).

* cited by examiner

PROCESS FOR PREPARING POLYAMIDES

CROSS-REFERENCE TO RELATED APPLICATIONS

This application is a national stage application (under 35 U.S.C. §371) of PCT/EP2010/068788, filed Dec. 3, 2010, which claims benefit of European Application 09178358.9, filed Dec. 8, 2009.

The invention relates to a process for preparing a polyamide based on dicarboxylic acids and diamines, more particularly for preparing partly aromatic, partly crystalline polyamides.

The preparation of polyamides with a high viscosity number in particular typically requires the employment of high reaction temperatures. These in turn lead to an increased extent of side reactions. The high viscosity additionally leads to increased deposit formation in the reactor and in the worst case to blockage of the reactor. Shutdown times and complex reactor cleaning are the consequences.

WO-A-2008/155281 already discloses one process for preparing polyamides, which already comprises stages A), B), C) and E) of the present invention. This process leaves something to be desired in relation to the reaction regime, in that further amine is metered in in the venting extruder.

It was an object of the present invention to remedy the aforementioned disadvantages.

Accordingly, a novel and improved process for preparing a polyamide based on dicarboxylic acids and diamines has been found, comprising the following stages:

A) providing an aqueous monomer mixture composed of dicarboxylic acids and diamines, where the molar ratio of dicarboxylic acids to diamines is adjusted such that, at the outlet of stage C), a molar deficiency of dicarboxylic acids or diamines of 1 to 10 mol %, based on the respective other component, is present, B) transferring the aqueous mixture from stage A) into a continuous evaporator reactor in which diamines and dicarboxylic acids are converted at a temperature in the range from 100 to 370° C. and a pressure in the range from 1 to 50 bar, C) transferring the mixture from stage B) into a separator which is operated at a temperature in the range from 100 to 370° C. and a pressure in the range from 1 to 50 bar with removal of gaseous components, D) transferring the mixture from stage C) together with diamine or dicarboxylic acid in an amount suitable for compensation for the molar deficiency into a tubular reactor which is operated at a temperature in the range from 100 to 370° C. and a pressure in the range from 1 to 50 bar, for a residence time in the range from 10 seconds to 30 minutes, E) transferring the mixture from stage D) into an extruder which is operated at a temperature in the range from 150 to 400° C. for a residence time in the range from 10 seconds to 30 minutes with removal of gaseous components through venting orifices.

The process according to the invention allows the reduction of the viscosity of the polyamide before the solid phase polycondensation and allows a reduction in the residence time at high temperature, as a result of which a lesser extent of side reactions such as triamine formation occurs and hence the quality of the product is improved. It has been found in accordance with the invention that a procedure in which dicarboxylic acid or diamine is at first present in deficiency and this deficiency is compensated for only on introduction into an extruder for postcondensation allows the preparation of, in particular, partly aromatic, partly crystalline polyamides with high viscosity number. The process is advantageous for preparation of all high molecular weight polyamides, but has advantages especially when the monomer mixture in stage A) consists of a dicarboxylic acid mixture of 60 to 88% by weight of terephthalic acid and 12 to 40% by weight of isophthalic acid, in which up to 20% by weight of the dicarboxylic acid mixture may also be replaced by other dicarboxylic acids, and hexamethylenediamine, up to 20% by weight of which may be replaced by other $C_{2-30}$-diamines.

The process according to the invention has the sequence of evaporator reactor—separator—tubular reactor, extruder, wherein an aqueous monomer mixture of dicarboxylic acids and diamines is conducted into the evaporator reactor. The molar ratio of dicarboxylic acids to diamines is adjusted such that, at the outlet of the downstream separator stage, there is a molar deficiency of dicarboxylic acids or diamines of 1 to 10 mol %, based on the respective other component. This can be achieved, for example, by providing a molar deficiency of dicarboxylic acid or diamine as early as on provision of the aqueous monomer mixture. When, however, a portion of the dicarboxylic acids or diamines is removed from the reaction mixture by evaporation downstream of the evaporator reactor, it is also possible to start with equimolar amounts of dicarboxylic acids and diamines in the evaporator reactor, since a deficiency of dicarboxylic acids or diamines is present downstream of the separator. The monomer ratio in stage A) is selected such that, at the outlet of stage C), there is a molar deficiency of dicarboxylic acids or diamines of 1 to 10 mol %, based on the respective other component. For example, in the case of 100 mol % of dicarboxylic acids, there may correspondingly be 90 to 99 mol % of diamines at the end of stage C). The specific stoichiometry to be established in the aqueous monomer mixture depends on the type of monomers and can be determined by simple analysis of the mixture obtained from the separator in stage C). For this purpose, it is possible, for example, to analyze the polyamide or polyamide oligomers obtained at the end of stage C) with regard to the carboxyl end groups and amino end groups.

In the case of use of the aforementioned preferred monomer mixture, hexamethylenediamine is typically partly discharged in gaseous form downstream of the evaporator reactor. It is thus possible, for example, to start with equimolar amounts of hexamethylenediamine and dicarboxylic acids, as a result of which a deficiency of hexamethylenediamine is present in the (pre)polymer at the end of the separator. However, it is also possible to start with a molar excess of hexamethylenediamine over terephthalic acid and isophthalic acid in stage A), such that there is a deficiency of terephthalic acid/isophthalic acid at the end of stage C). In this case, terephthalic acid/isophthalic acid is then metered into the tubular reactor in stage D).

Typically, in stage A), an aqueous salt solution of the starting monomers is used, since diamines and dicarboxylic acids form salts.

The monomer mixture consists preferably of 50 mol % of dicarboxylic acid mixture and 50 mol % of diamine or diamine mixture. The dicarboxylic acid mixture consists of 60 to 88% by weight of terephthalic acid and 12 to 40% by weight of isophthalic acid. Preferably 64 to 80% and especially 64 to 76% by weight of terephthalic acid is present, and correspondingly preferably 20 to 36% by weight and especially 24 to 36% by weight of isophthalic acid. In addition, it is also possible for up to 20% by weight of the dicarboxylic acid mixture to be replaced by other dicarboxylic acids. This is preferably 0 to 10% by weight, especially 0 to 5% by weight. When a portion of the dicarboxylic acid mixture is replaced by other dicarboxylic acids, the lower limit in the other component is preferably 0.5% by weight, especially 1% by weight. Other suitable dicarboxylic acids are, for example, adipic acid, pimelic acid, suberic acid, azelaic acid and sebacic acid, and also 7-sulfoisophthalic acid.

The diamine component used is hexamethylenediamine, up to 20% by weight of which may be replaced by other $C_2$-$C_{30}$-diamines. Preferably 0 to 10% by weight, especially 0 to 5% by weight, of the hexamethylenediamine is replaced by other $C_2$-$C_{30}$-diamines. When other $C_2$-$C_{30}$-diamines are present, the minimum amount thereof is preferably 0.5% by weight, especially at least 1% by weight. Suitable further diamines are, for example, tetramethylenediamine, octamethylenediamine, decamethylenediamine and dodecamethylenediamine, and also m-xylylenediamine, bis(4-aminophenyl)methane, bis(4-aminophenyl)propane-2,2 and bis(4-aminocyclohexyl)methane, or mixtures thereof.

The additional diamine used is preferably bis(4-aminocyclohexyl)methane, which is available from BASF SE under the Dicycan name.

Preference is given to using no other dicarboxylic acids or diamines aside from terephthalic acid, isophthalic acid and hexamethylenediamine.

In stage B), the aqueous mixture from stage A) is transferred into a continuous evaporator reactor in which diamines and dicarboxylic acids are converted at a temperature in the range from 100 to 370° C., preferably 200 to 340° C., and a pressure in the range from 1 to 50 bar, preferably 5 to 30 bar. The evaporator reactor may be in any suitable configuration. It may, for example, be a tube bundle reactor as described in EP-A-0 129 195. It is preferably a vertical tubular reactor through which the flow is from the top downward.

The residence time in stage B) is preferably 0.2 to 10 minutes, more preferably 1 to 5 minutes.

The evaporator reactor is followed by a separator which is operated at a temperature of 100 to 370° C., preferably 200 to 340° C. The pressure in the separator is preferably 1 to 50 bar, more preferably 5 to 30 bar. The residence time in stage C) is preferably 1 to 45 minutes, more preferably 2 to 15 minutes. In the separator, gaseous components, especially water and volatile monomers, are removed. For example, in the case of use of the above-described preferred monomer mixture, about 1 to 10% of the originally used diamine, hexamethylenediamine, is removed together with water vapor. This gaseous mixture can then be subjected to a distillation or rectification, wherein water vapor is drawn off via the top to obtain a diamine/water mixture in the bottom. This mixture can be recycled into stage A) or B) or into both stages. In general, water vapor and volatile dicarboxylic acids or diamines are removed in stage C) and are then separated by distillation, and an aqueous condensate enriched in dicarboxylic acids or diamines is recycled into one or both of stages A) and B).

The proportion of the diamines discharged with the evaporation, which are recycled into the process, can likewise be used to establish the deficiency of diamines.

The separator of stage C) is followed by a tubular reactor in stage D), into which the mixture from stage C) is conducted together with diamine or dicarboxylic acid in an amount suitable for compensation for the molar deficiency. The tubular reactor is operated at a temperature in the range from 150 to 400° C., preferably 200 to 370° C., and is adjusted to a residence time in the range from 10 seconds to 30 minutes, preferably 2 seconds to 10 minutes.

The tubular reactor of stage D) is followed by an extruder in stage E), into which the mixture from stage D) is conducted. The extruder is operated at a temperature in the range from 150 to 400° C., preferably 200 to 370° C., and is adjusted to a residence time in the range from 10 seconds to 30 minutes, preferably 2 seconds to 2 minutes. In the extruder, gaseous components are likewise removed through venting orifices.

Suitable extruders with venting stages are known to those skilled in the art. It is possible with preference in accordance with the invention to use twin-screw extruders, which may be corotatory or contrarotatory twin-screw extruders. For a description of the extruders, reference may be made to EP-A-0 129 195 and DE-A-195 14 145.

In stage D), diamine or dicarboxylic acid is metered in according to whether there is a deficiency of diamine or dicarboxylic acid after stage C). The amount suitable for compensating for the molar deficiency can be determined by simple tests, it being possible to determine the carboxyl end group content and the amino end group content in the polyamide obtained downstream of the extruder. When a deficiency of diamines is employed at first, preference is given to metering in sufficient diamine in stage D) that the amino end group content is increased by at least 20 mmol/kg. The amino end group content at the end of stage D) is preferably 30 to 250 mmol/kg, more preferably 50 to 100 mmol/kg or 40 to 220 mmol/kg. Addition in other stages of the process according to the invention is also possible.

The extrusion may additionally be followed by a solid phase postcondensation and a pelletizing step.

The polyamides obtained after stage E) preferably have a viscosity number in the range from 20 to 200, more preferably from 40 to 80, especially in the case of use of the above-described preferred monomer mixture. In the case of use of hexamethylenediamine, it is also possible to meter in another diamine in stage D), for example Dicycan. In addition, it is possible in accordance with the invention to meter in further additives at different points in the process, such as oxazolines, hyperbranched polymers with amino or carboxyl groups and other additives. The additives can be supplied, for example, upstream or downstream of a discharge pump downstream of the evaporator reactor, as a cold feed or as a hot feed in the separator.

Preferred polyamides obtainable in accordance with the invention possess a glass transition temperature in the range from 110 to 150° C. and a melting point in the range from 280 to 320° C. They preferably have a crystallinity of more than 20% and are therefore not transparent.

The polyamides preparable in accordance with the invention are suitable, for example, for motor vehicle or automotive use, for example for the interior lining of passenger cells, for instrument panels, for covers, for example, of valve casings, for securing bases of fan and ventilator motors, for base plates for control, for exhaust gas recycling components, for air supply modules, for example, of turbochargers or diesel turbochargers, such as housings of intercoolers, for the design of the throttle valve assembly of gasoline and diesel engines, for gasoline- and oil-conducting systems or those which may come into contact therewith, in the form of connectors, fittings, filter housings and injection rails, for intake and discharge regions for liquids in cooling systems, for vessels and connecting pieces for brake fluids, for vehicle electrics or vehicle electronics, for example in the form of connectors and plugs for electronic control systems, for electrical and electronic applications, for example for plugs, collector holders in electric motors, bladed wheels in vacuum cleaners, switching elements and relays, and electric and electronic components, especially those mounted with soldering technology, for drinking water, heating, sanitary and bathroom application, for example for pipes, seals, valves, fittings and vessels, for domestic application, for example for domestic appliances such as coffee and espresso machines, white goods such as dishwashers and washing machines and laundry dryers or kitchen spray heads, for medical application, for example for syringes, cannulas, bags, gloves or ejector guns for dental materials, for application as a metal substitute, for example for the injection molding, for example, of fittings or clamping rings.

EXAMPLES

The plant for continuous preparation of high-temperature-resistant polyamides from diamines (hexamethylenediamine, HMD) and dicarboxylic acids consists of the following function groups:
Mixture preparation
Metering and heating
Preliminary condensation
Postcondensation in separator
Postcondensation in tubular reactor
HMD rectification
Venting and pelletizing
Process Description:

The reaction solution is prepared from the diamines, dicarboxylic acids, regulator and water in the mixture preparation in the stirred tank, and transferred into the reservoir vessel. From the reservoir vessel, the reaction solution is metered by means of the feed pump via the heater into the top of the vertical evaporator reactor. In the diphyl-heated apparatus filled with random packings, the monomers react under pressure at high temperature with elimination of water (polycondensation) to give the low molecular weight precursor. The emerging mixture of precursor, vaporous water of dissolution and reaction and some of the unconverted diamines and diacids is passed into the downstream separator. The polymer melt is separated therein from the vaporous components. The vapor streams removed are conducted to the rectifying column and sprayed with cold water. This separates the evaporated monomers and the entrained polymer particles from the water vapor. Diamines obtained in the form of aqueous solution in the bottoms are pumped in circulation and, after removal of the polymer particles which have now solidified by means of filters, pumped back to the reaction solution upstream of the evaporator reactor. The polymer melt from the separator is passed to a tubular reactor and is enriched with amine. A regulating valve is used to meter the melt from the tubular reactor to the extruder, and the rest of the water is outgassed. Polymer discharged in strands is cooled with water and pelletized.

Mixture Preparation

All components of the mixture (approx. 2500 kg) are dissolved in the stirred tank at 95° C. After a dissolution time of 60 min, a sample is taken for pH determination. The pH is adjusted by adding HMD or a terephthalic acid/isophthalic acid mixture to a pH of 6.5-7.05, in order to adjust the stoichiometry of the mixture. Subsequently, the amount of regulator required is added.

When the mixture has been prepared as described, it can be transferred to the reservoir tank via a vapor recovery line.
Metering and Heating
Preliminary Condensation From the reservoir vessel, the mixture solution is pumped by means of a feed pump heated to 95° C. to the evaporator reactor.

In this diphyl-heated reactor, the monomers react with elimination of water to give low molecular weight, i.e. short-chain, polyamide. At the same time, virtually all of the water of dissolution and reaction evaporates.

The evaporator reactor consists of 10 tubes with a diameter of 33.6 mm and length 4000 mm. The filling consists of 5 mm Raschig rings with a central element. The evaporator reactor is safeguarded on the inlet side with a safety valve.
Postcondensation The downstream separator serves for phase separation of the mixture of prepolymer and water vapor, which flows into the apparatus via an intake tube. The separator has a construction length of 1800 mm and an internal diameter of 300 mm, with the last 250 mm tapering conically. The intake tube is arranged eccentrically at the side. With the aid of this tube, which is open in the downward direction, the phase mixture is introduced in the half of the separator close to the wall.

In order to keep the prepolymer in molten form, the separator is heated with diphyl through a jacket. The vapors leave the apparatus via the vapor line in the lid in the direction of the diamine rectification column.

Since this system is under pressure (20 bar), a small proportion of water remains dissolved in the polyamide melt.

This water content restricts the molecular weight increase and leads to melting point depression.

The polyamide melt is supplied to the venting extruder via a regulating valve.
Diamine Recycling The vapors are introduced into an unheated rectifying column. They are scrubbed there in countercurrent with water. This discharges water-soluble oligomers from the column with the scrubbing water. The pressure in the column is controlled by means of a steam-heated regulating valve at the top of the column. The column spraying is through the top hood. Below the column is a level measuring system via pressure difference. In the column, the organic components are scrubbed out of the vapors by means of spraying. From the circulation system of the column bottoms (approx. 1000 l/h), the precipitated component is recycled into the product stream upstream of the evaporator reactor. The recycle rate is about 40 l/h. The top stream of the column is discharged. This top stream (approx. 70 kg/h) comprises all of the water and a small proportion of diamine (0.3-0.5%). The diamine has to be considered as a loss since it is withdrawn from the reaction.
Degassing and Pelletization A discharge valve regulates the constant product flow to the extruder. The extruder is a ZDSK 57. The screw is sealed in the backward direction by means of metered addition of a cold feed of 2 kg/h of pellets. In the extruder, the water present in the polymer melt is removed by means of forward venting and backward venting. The polymer melt is pelletized with underwater pelletization technology.

Examples 1 to 5

The amount and process parameters can be found in the table which follows.

Hexamethylenediamine solution (69.47% in water, BASF), meta-xylenediamine (MXD), terephthalic acid (TPA), isophthalic acid (IPA) (Lonza) were mixed with water in a feed vessel at 93° C.

Salt solution was pumped into the evaporator reactor at the product outlet temperature and a pressure (see table). The product temperature and pressure can be found in the table. Meta-xylenediamine (MXD) was subsequently metered into the tubular reactor. The polymer melt was extruded and pelletized at 320° C. and then heat-treated as evident from the table.

The results are compiled in the table which follows:

| Example | Water/kg | HMD/kg | MXD/kg | TPA/kg | IPA/kg | Feed kg/h | Product T downstream of evaporator reactor/° C. | Pressure upstream of evaporator reactor/bar | Product temp. in the separator/° C. |
|---|---|---|---|---|---|---|---|---|---|
| 1 | 1046 | 701.5 | 28.5 | 503 | 237.9 | 132 | 312 | 20 | 212 |
| 2 | 1016 | 690 | 27.4 | 502 | 214.3 | 117 | 317 | 19.7 | 212 |
| 3 | 1016 | 690 | 27.4 | 502 | 214.3 | 86 | 332 | 21.3 | 212 |
| 4 | 1000 | 671.7 | 27.4 | 502 | 206 | 114 | 314 | 20.2 | 212 |
| 5 | 1001 | 674.5 | 25.1 | 500 | 205.0 | 103 | 317 | 20.3 | 212 |

| Example | Pressure in the separator/bar | Subsequent MXD addition/ml/min | Heat treatment/h | Heat treatment/° C. | RT before heat treatment/ml/g | AEC before heat treatment/mmol/kg | RT after heat treatment/ml/g | AEC after heat treatment/mmol/kg |
|---|---|---|---|---|---|---|---|---|
| 1 | 17 | 20 | — | — | 50 | 46 | — | — |
| 2 | 18.1 | 20 | — | — | 60 | 65 | — | — |
| 3 | 18 | 20 | — | — | 192.5 | 71 | — | — |
| 4 | 18.7 | 10 | — | — | 32.1 | 46 | — | — |
| 5 | 19 | 15 | 24 | 200 | 62 | 55 | 93 | 19 |

RT = Residence time
AEC = Amino end group content

The invention claimed is:

1. A process for preparing a polyamide based on dicarboxylic acids and diamines, which comprises:
    A) providing an aqueous monomer mixture composed of dicarboxylic acids and diamines, where the molar ratio of dicarboxylic acids to diamines is adjusted such that, at the outlet of stage C), there is a molar deficiency of dicarboxylic acids or diamines of 1 to 10 mol %, based on the respective other component,
    B) transferring the aqueous mixture from stage A) into a continuous evaporator reactor in which diamines and dicarboxylic acids are converted at a temperature in the range from 100 to 370° C. and a pressure in the range from 1 to 50 bar,
    C) transferring the mixture from stage B) into a separator which is operated at a temperature in the range from 100 to 370° C. and a pressure in the range from 1 to 50 bar with removal of gaseous components,
    D) transferring the mixture from stage C) together with diamine or dicarboxylic acid in an amount suitable for compensation for the molar deficiency into a tubular reactor which is operated at a temperature in the range from 100 to 370° C. and a pressure in the range from 1 to 50 bar, for a residence time in the range from 10 seconds to 30 minutes, and
    E) transferring the mixture from stage D) into an extruder which is operated at a temperature in the range from 150 to 400° C. for a residence time in the range from 10 seconds to 30 minutes with removal of gaseous components through venting orifices.

2. The process according to claim 1, wherein the extrusion is followed by a pelletizing step and solid phase postcondensation.

3. The process according to claim 1, wherein water vapor and volatile dicarboxylic acids or diamines are removed in stage C) and are then separated by distillation, and an aqueous condensate enriched in dicarboxylic acid or diamine is recycled into one or both of stages A) and B).

4. The process according to claim 1, wherein the evaporator reactor is a vertical tubular reactor through which the flow is from the top downward.

5. The process according to claim 1, wherein the monomer mixture in stage A) consists of a dicarboxylic acid mixture of 60 to 88% by weight of terephthalic acid and 12 to 40% by weight of isophthalic acid, in which up to 20% by weight of the dicarboxylic acid mixture is optionally replaced by other dicarboxylic acids, and hexamethylenediamine, up to 20% by weight of which is optionally replaced by other $C_{2-30}$-diamines.

6. The process according to claim 5, wherein equimolar amounts of dicarboxylic acids and diamines are present in the monomer mixture, 0.5 to 15% by weight of the hexamethylenediamine used in stage A) is removed in gaseous form in the separator in stage C) and sufficient hexamethylenediamine is added in stage D) that the content of amino end groups in the polyamide obtained at the end of stage E) is 40 to 220 mmol/kg.

7. The process according to claim 5, wherein sufficient diamine is metered in stage D) that the amino end group content is increased by at least 20 mmol/kg.

8. The process according to claim 1, wherein a fiber, a filler, a dye, an assistant or a mixture thereof is supplied to the compounding directly in the extruder.

9. The process according to claim 1, wherein the tubular reactor is equipped completely or partially with static mixers.

10. A vehicle which comprises the polyamide obtained according to the process of claim 1.

11. An article which comprises the polyamide obtained according to the process of claim 1, wherein the article is in the domestic sector, in the electrical sector, in the electronic sector, in the drinking water sector, in the heating sector, in the sanitary or bathroom sector or in the medical technology sector.

12. A metal substitute which comprises the polyamide obtained according to the process of claim 1.

* * * * *